United States Patent [19]

Sakakihara et al.

[11] Patent Number: 4,796,285
[45] Date of Patent: Jan. 3, 1989

[54] X-RAY RADIOGRAPHY APPARATUS

[75] Inventors: Hisashi Sakakihara; Shigeru Sasaki, both of Ootawara, Japan

[73] Assignee: Kabushiki Kaisha Toshiba, Kawasaki, Japan

[21] Appl. No.: 177,841

[22] Filed: Mar. 25, 1988

Related U.S. Application Data

[63] Continuation of Ser. No. 943,172, Dec. 18, 1986, abandoned.

[30] Foreign Application Priority Data

Dec. 20, 1985 [JP] Japan ............................... 60-285727

[51] Int. Cl.$^4$ ............................................. G03B 41/16
[52] U.S. Cl. .................................... 378/173; 378/181; 378/174; 271/258; 271/155; 250/327.2
[58] Field of Search ............... 378/181, 182, 171–174; 250/327.2; 271/258, 259, 265, 18.1, 19, 155; 414/220–222

[56] References Cited

FOREIGN PATENT DOCUMENTS

| 0159639 | 12/1981 | Japan | 378/174 |
| 0167137 | 12/1981 | Japan | 378/174 |
| 0063637 | 4/1983 | Japan | 271/258 |
| 0063636 | 4/1983 | Japan | 271/258 |
| 0183546 | 10/1983 | Japan | 271/258 |
| 0157629 | 9/1984 | Japan | 378/173 |

Primary Examiner—Carolyn E. Fields
Assistant Examiner—Joseph A. Hynds
Attorney, Agent, or Firm—Finnegan, Henderson, Farabow, Garrett, & Dunner

[57] ABSTRACT

An X-ray radiography apparatus having a supply magazine, a film-removing unit, an X-ray imaging unit, a reference position detector, a suction detector, a distance detector, a discriminator, and a display unit. The supply magazine contains a stack of unexposed films. The reference position detector detects when the suction unit passes a reference position located above the supply magazine. The suction detector detects when a sheet film has been attracted to the suction unit. The distance detector detects the distance the suction unit has moved vertically, from the outputs of the reference position detector and the suction detector. This distance is equal to the distance between the reference position and the topmost unexposed film stored in the magazine. The discriminator determines the number of unexposed films remaining in the supply vessel from the distance detected by the distance detector.

8 Claims, 8 Drawing Sheets

F I G. 4
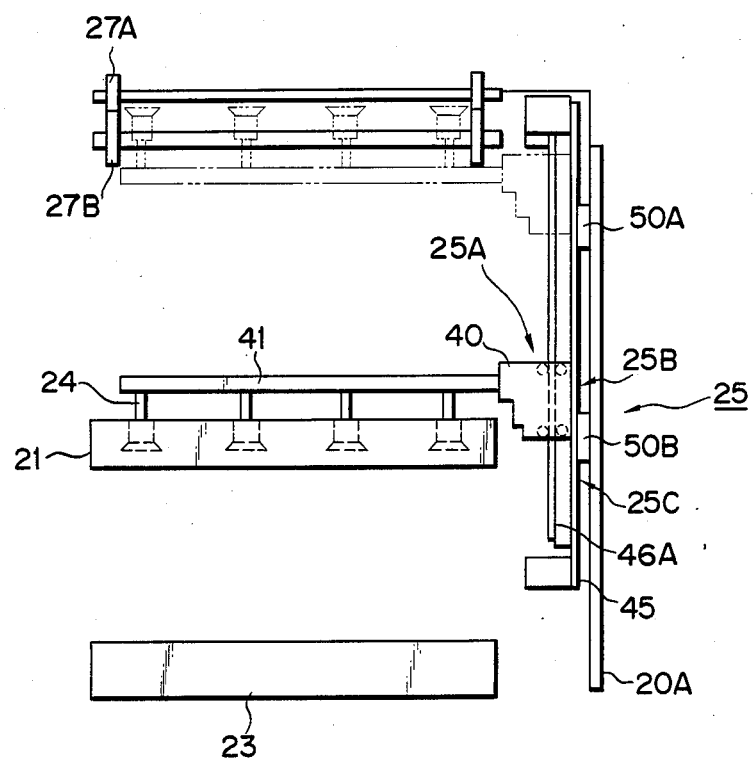

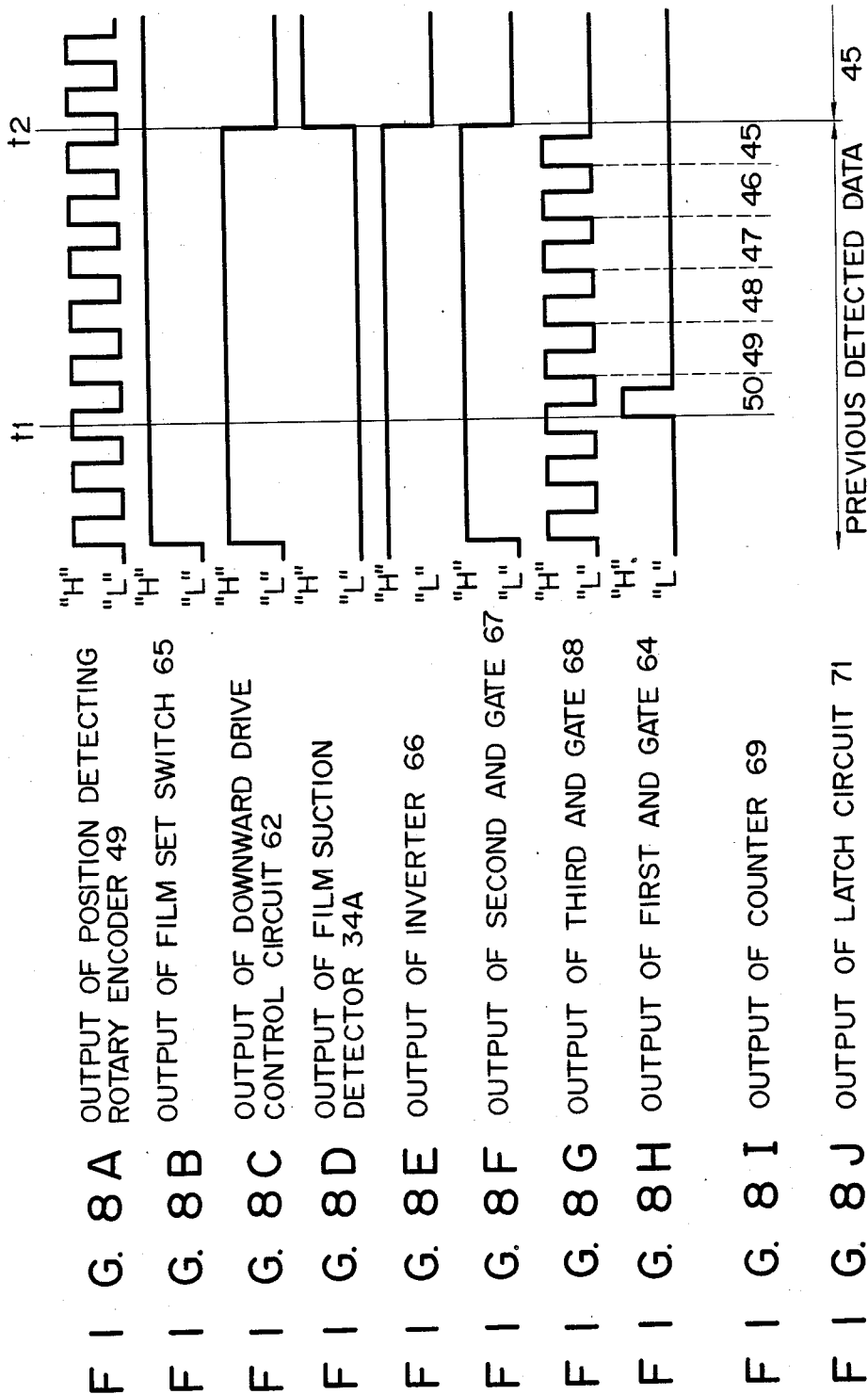

X-RAY RADIOGRAPHY APPARATUS

This is a continuation of application Ser. No. 943,172, filed Dec. 18, 1986, now abandoned.

BACKGROUND OF THE INVENTION

This invention relates to an X-ray radiography apparatus for forming X-ray images on a plurality of imaging medium sheets removed, one by one, from a supply magazine, and more particularly, to an apparatus which can not only form X-ray images on the sheets but also display the number of unexposed sheets remaining in the supply magazine.

FIG. 1 shows a conventional X-ray radiography apparatus for forming X-ray images on a plurality of imaging medium sheets removed, one by one, from a supply magazine. This apparatus has supply magazine 1 containing a stack of imaging media, or sheet films 2. Suction cup 3 made of soft material, such as rubber, is provided above magazine 1. Cup 3 is repeatedly moved up and down, and also to the left to the right, and vice versa, thereby removing films 2, one by one, from the upper side of magazine 1. More specifically, cup 3 is moved down, contacts the topmost film 2, attracts this film to it, and is moved up, thereby drawing the film from magazine 1 through the opening cut in the upper side of magazine 1. Still holding sheet film 2, cup 3 moves to the vicinity of a pair of conveying rollers 4, whereupon the end of film 2 is nipped therebetween.

The apparatus further comprises film holder 5 provided on the output side of rollers 4. Holder 5 has a pair of plates 5A and 5B hinged at one side, such that holder 5 can open and close. A sensitized sheet is bonded to an inner surface of each of plates 5A and 5B. Holder 5 is usually open to receive sheet film 2 from rollers 4. It is closed upon receipt of film 2, as plate 5A is rotated in the direction of arrow B, thereby holding sheet film 2.

Thereafter, film 2, which is held by holder 5, remains in waiting position 6A until the operator commands an image-forming operation to be performed.

When the operator gives an image-forming command, film holder 5 is moved rapidly to imaging position 7A. In position 7A, an X-ray image of patient PA on bed BT is formed on sheet film 2 held by holder 5 as patient PA is exposed to the X rays emitted from X-ray tube XT. After the image-forming operation has been completed, holder 5 is returned to waiting position 6A, whereupon it is opened. Then, conveying rollers 4 are rotated in the reverse direction. The exposed film in holder 5 is nipped between reversely rotating rollers 4, and is thus fed from rollers 4. At this time, direction-switching member 8, provided near rollers 4 and hinged to shaft 8A, is rotated around shaft 8A in the direction of arrow E (FIG. 1). As a result, exposed film 2, fed from rollers 4, is guided by member 8 into guide passage 9, and is fed therethrough into magazine 10 situated below supply magazine 1.

Most X-ray radiography apparatus of this type are provided with a TV camera (not shown) and a CRT (Cathode Ray Tube) display (not shown, either), in order to pick up X-ray images and display them. That is, the TV camera receives the X-ray images detected by an image intensifier (I.I.) provided behind imaging position 7A, and the CRT display displays these X-ray images.

The operator sees the X-ray images displayed, one after another, on the CRT display, and gives an image-forming command the moment the CRT display shows the image he or she desires. In accordance with this command, the apparatus forms the X-ray image on sheet film 2.

Supply magazine 1 can contain 50 to 100 unexposed sheet films 2 at most. Since magazine 1 is provided within the housing of the apparatus, the operator cannot know how many unexposed films 2 are left in magazine 1 unless he or she pulls magazine 1 out of the housing and looks into it. To confirm the number of films remaining in magazine 1, the operator must record the number of films 1 before starting the image-forming operation, then count exposed films 2, and subtract the count from the number of films 2 stored in magazine 1 before the image-forming operation. This method is cumbersome and is unreliable and, since it is very difficult for the operator to accurately count unexposed films 2 stored in magazine before the image-forming operation and to correctly count exposed films 2 during the operation. Unless the number of films 2 remaining in magazine 1 can be confirmed, various problems will arise. Sometimes, the contrast medium, injected into patient PA to obtain a clear-cut X-ray image of a region of interest, reaches the region shortly after the last unexposed film supplied from magazine 1 has been exposed. In this case, the operator must pull magazine 1 from the housing of the apparatus, fill it with unexposed films 2, and insert it back into the housing. When the first of the refilled films 2 reaches imaging postion 7A, the contrast medium has already been drained from the region of interest, and the medium must be injected again into patient PA, particularly in the case of angiography. To obtain a clear-cut X-ray image of the stomach, patient PA must be moved again, such that the medium injected again reaches the region of interest. Hence, some measures should be taken to allow the operator to known how many unexposed films 2 remain in supply magazine 1.

To this end, a device, which can detect when the number of films remaining in a magazine has been reduced below a predetermined value, has been proposed in Japanese Patent Disclosure No. 57-114134. The device has an optical fiber for guiding light from a light source to a suction unit (i.e., a suction cup), and a photodetector provided on the side wall of the magazine. The photodetector is positioned such that the light-emitting end of the optical fiber is optically coupled to the photodetector when the number of the remaining films is reduced to the predetermined value. Hence, when the photodetector receives the light guided by the fiber, it can detect that the number of the films left in the magazine has just been reduced to a predetermined value. This device, however, cannot detect how many unexposed films 2 are thereafter left in magazine 1. Another problem with the device is that the photodetector must be connected to a detection circuit by a connecting wire.

SUMMARY OF THE INVENTION

An object of this invention is to provide an X-ray radiography apparatus which can permit the operator to know how many unexposed sheet films remain in a supply magazine.

According to the present invention, there is provided an X-ray radiograph apparatus comprising a supply magazine, a film-removing unit, an X-ray imaging unit, a reference position detector, a suction detector, a distance detector, a discriminator, and a display unit. The supply magazine contains a stack of unexposed films. The film-removing unit has a suction unit for holding a film and removing it from the magazine. The X-ray imaging unit forms an X-ray image of a subject on the film fed from the magazine by the film-removing unit. The reference position detector detects that the suction unit is passing a reference position located above the supply magazine. The suction detector detects that a sheet film has been attracted to the suction unit. The distance detector detects the distance the suction unit has moved vertically, from the outputs of the reference position detector and suction detector. This distance is equal to the distance between the reference position and the topmost unexposed film stored in the magazine. The discriminator determines the number of unexposed films remaining in the supply vessel, from the distance detected by the distance detector. The display unit displays the number of unexposed films, which has been determined by the discriminator.

Since the number of unexposed films left in the supply magazine is determined from the distance the suction unit has moved vertically, which has been detected from the outputs of the reference position detector and suction detector, the operator need not record the number of the unexposed films initially loaded in the magazine or count the exposed films during the image-forming operation. Since no detectors are provided within the supply magazine, the apparatus is simple in structure.

BRIEF DESCRIPTION OF THE DRAWINGS

FIG. 4 is a view showing in detail part of the apparatus of FIG. 2 as seen from the side;

FIGS. 8A to 8J are timing charts for describing the operation of the control circuit of FIG. 7.

DETAILED DESCRIPTION OF THE PREFERRED EMBODIMENTS

Figure 1:
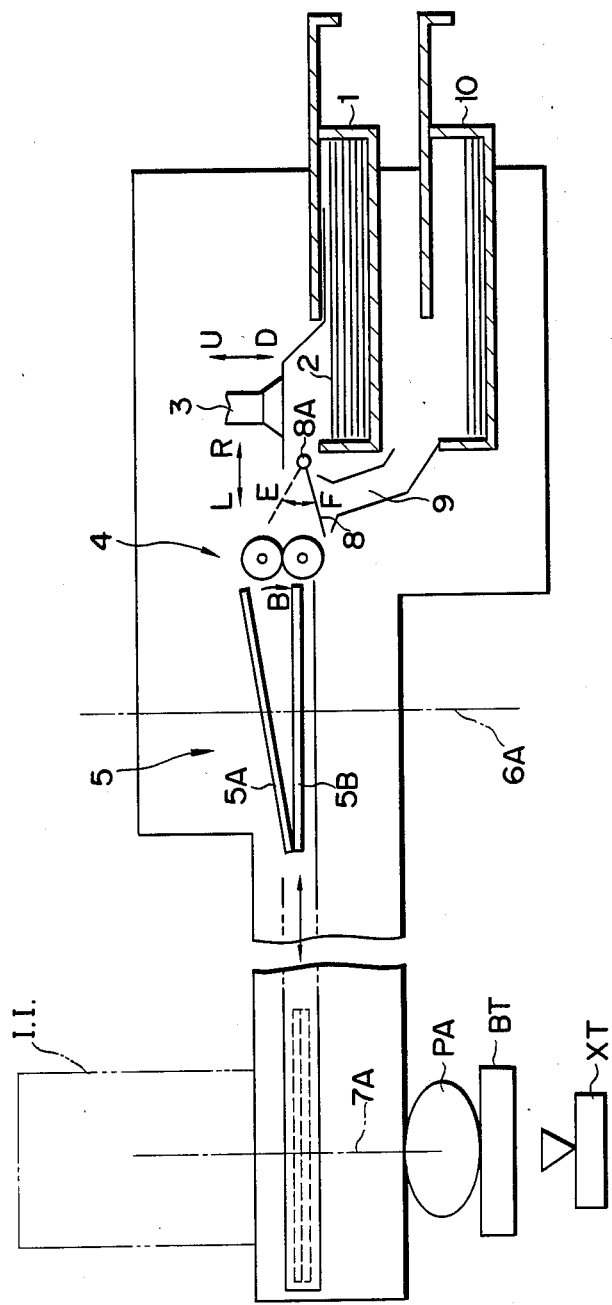
FIG. 1 is a schematic view showing an example of the schematic construction of main portions of a conventional X-ray radiography apparatus.
Figure 2:
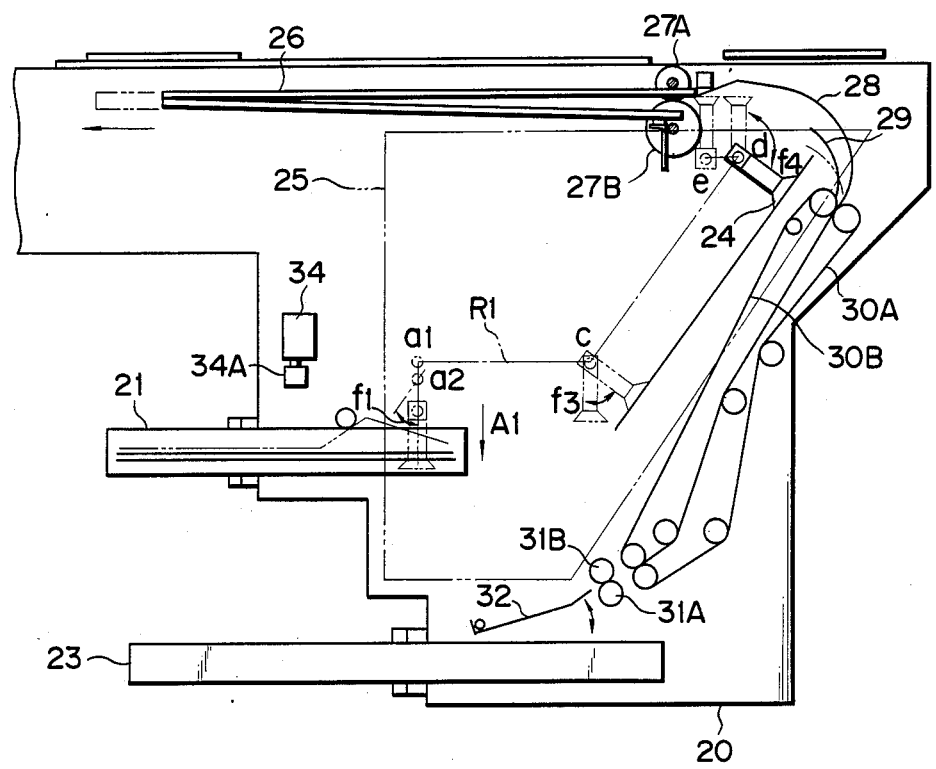
FIG. 2 is a sectional view showing general construction of part of an X-ray radiography apparatus according to an embodiment of the present invention as seen from a front side.
Figure 3:
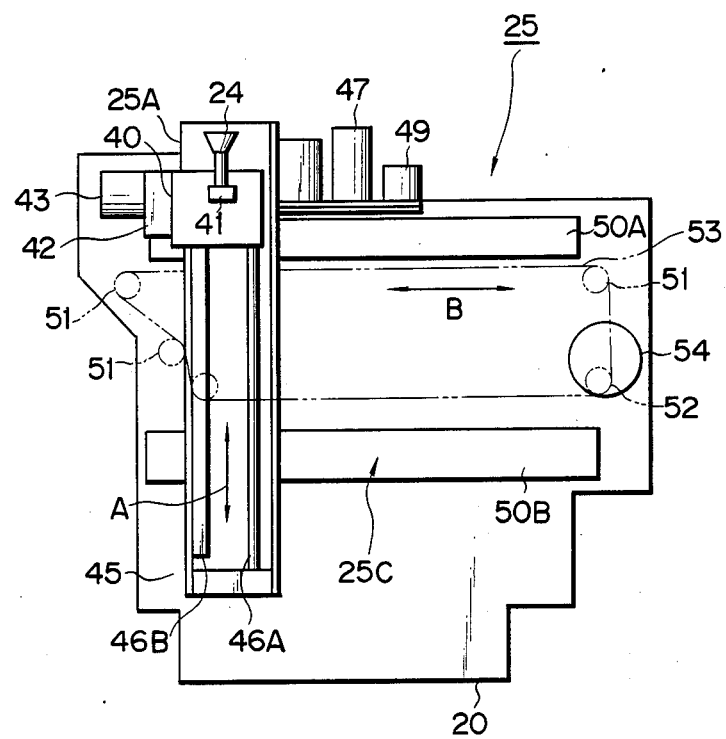
FIG. 3 is a view showing in detail part of the apparatus of FIG. 2.
Figure 5:
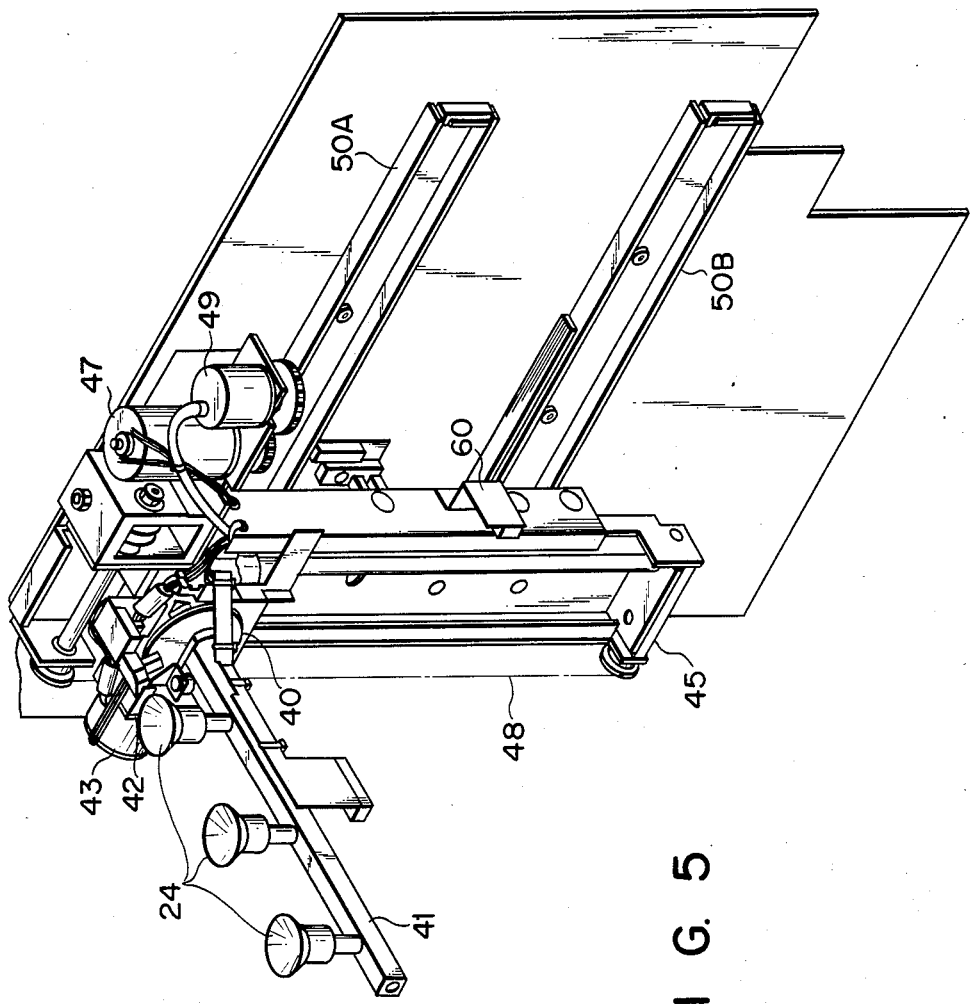
FIGS. 5 and 6 are perspective views showing in detail parts of the apparatus of FIG. 2.
Figure 6:
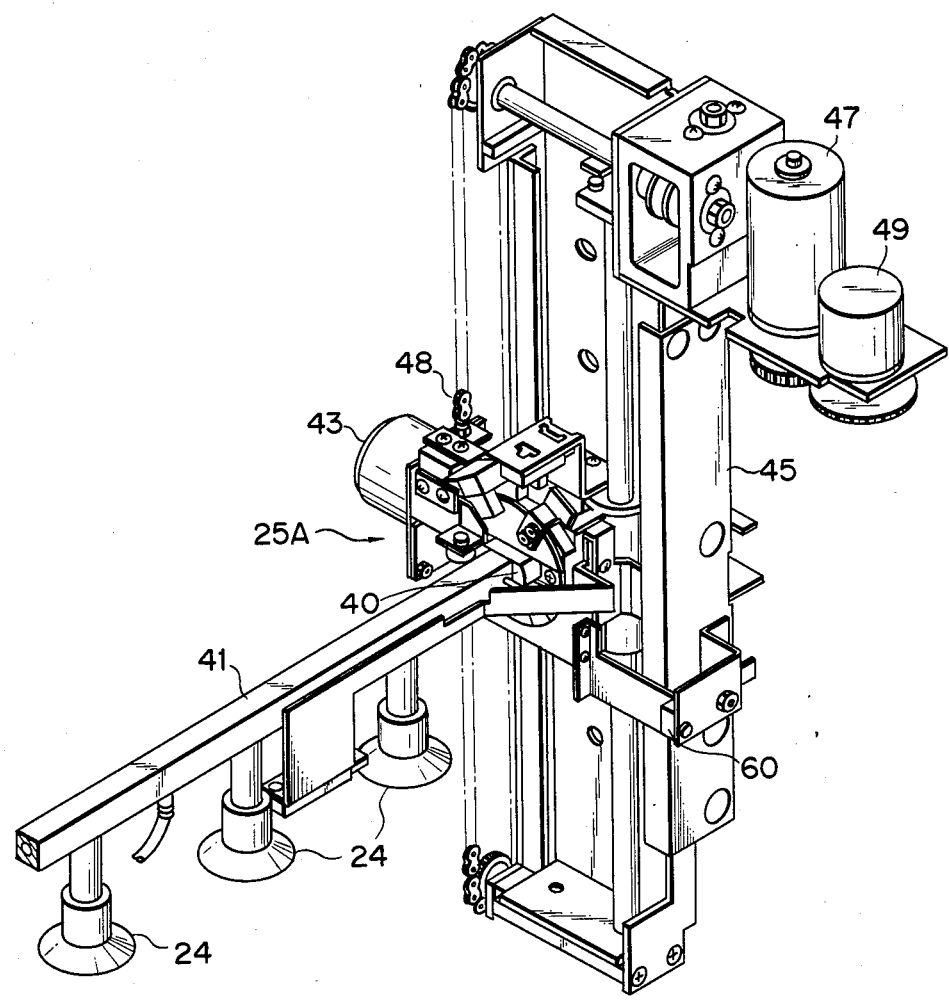

FIGS. 2, 3 and 4 are a front sectional view, a back and side view, respectively of the interior of the frame in the essential portion of an X-ray radiography apparatus according to an embodiment of the present invention. In this embodiment, X-ray sheet films are used as imaging medium sheets. In the portions shown in FIGS. 2 to 4, unexposed X-ray sheet films are removed from film supply magazine 21, conveyed to sense an X-ray image, the exposed films are conveyed and fed to film recovery magazine 23. FIGS. 5 and 6 are perspective views showing in detail the portion of the apparatus for attracting and conveying the films.

As shown in FIG. 2, magazine 21 which contains unexposed imaging medium sheets, such as X-ray films is detachably mounted in frame 20. Magazine 23 for containing the exposed films in the lower portion thereof is detachably mounted in frame 20. Suction cups 24 and drive mechanism 25 are provided in frame 20. Cups 24 are suction units for attracting and removing unexposed films from magazine 21. Drive mechanism 25 rotates and moves cups 24. The detail of mechanism 25 will be described later.

Film holder 26 is movably provided in the upper portion of frame 20. Holder 26 has a pair of plateshaped members openably coupled by a hinge, and sensitized sheets bonded to the inner surfaces of the members. Holder 26 holds unexposed sheet films closely contacted at both sides with the sensitized sheets on the inner surfaces of the members for an X-ray imaging operation. When holder 26 is disposed at standby position, a feeding mechanism for feeding the unexposed film conveyed by cups 24 moving by drive mechanism 25, such as a pair of opposed conveying rollers 27A and 27B, is provided near the position of the opening end of holder 26. Rollers 27A and 27B are reversely rotatably composed. When rollers 27A and 27B are rotated in a first direction, the unexposed film is fed into holder 26. After the film is X-ray imaged, rollers 27A and 27B are reversely rotated to draw the imaged film in holder 26. The drawn imaged film is guided downwardly by a stationary guide 28 and a movable guide 29 disposed at the position designated by an imaginary line (two-dotted line) of FIG. 2 at this time. The exposed film is further held between a pair of conveying belts 30A and 30B, and conveyed. Belts 30A and 30B are supported by a plurality of rollers and so opposed as to partly contact with one another in such a manner that the contacting portions are synchronously cooperated in the same direction. The exposed film is interposed at the contacting portions between belts 30A and 30B and conveyed. A pair of opposed feeding rollers 31A and 31B rotatably driven in predetermined directions are provided near the ends of belts 30A and 30B. A rockable plate 32 rotatably reciprocated in a predetermined angular range is provided between the pair of rollers 31A, 31B and magazine 23. The exposed film conveyed by belts 30A, 30B is further fed by rollers 30A, 31B into magazine 23. Plate 32 is fluctuated whenever on film is fed to effectively feed the exposed film fed by rollers 31A, 31B into magazine 23.

Cups 24 and vacuum pump 34 for operating cups 24 are coupled by suction cylinder 42 (shown in FIG. 3) to be described in detail later and a flexible pipe, not shown.

Referring to FIGS. 3 to 6, drive mechanism 25 will be described in detail.

As shown in FIG. 3, drive mechanism 25 has rotary drive unit 25A for rotating cups 24, first linear drive unit 25B (shown in FIG. 4) for linearly moving cups 24 together with drive unit 25A in a first direction, and second linear drive unit 25C for linearly moving cups 24 together with units 25A and 25B in a second direction crossing the first direction. Drive mechanism 25 is supported by side plate 20A (as shown in FIG. 4) of frame 20.

Drive unit 25A has suction cylinder holder 40, suction cylinder 41, gear box 42 and motor 43. Cylinder 41 is rotatably attached to holder 40, and a plurality of cups 24 are aligned substantially linearly on cylinder 41. Cylinder 41 is coupled with pump 34 (shown in FIG. 2), cups 24 are evacuated through cylinder 41 by pump 34 to remove air in cups 24, thereby operating cups 24. Film suction detector 34A, having a vacuum switch operated by the pneumatic change when the film is attracted due to the evacuation of air in cups 24 when cups 24 are pressed to film is used to detect the suction of the film and is provided in pump 34. Holder 40 is coupled through box 42 with motor 43 for rotating cylinder 41 on a central axis of cylinder 41.

First drive unit 25B has rightward and leftward moving holder 45, upward and downward moving guide members 46A, 46B, respectively upward and downward drive motor 47, upward and downward moving position detecting rotary encoder 49 and film reference position detector 60 (shown in FIG. 5). A pair of members 46A and 46B are fixedly secured to holder 45 in the elevational direction of FIG. 3 in parallel with one another. Holder 40 is upwardly and downwardly movably mounted on guide members 46A and 46B. Motor 47 for driving holder 40 upwardly and downwardly is provided at the side of holder 45. Holder 40 is driven through chain 48 by motor 47 (as shown in FIG. 5), and linearly moved in a direction of an arrow A of FIG. 3 along members 46A and 46B. Encoder 49 is coupled at a suitable reduction gear ratio through a gear with the output shaft of motor 47. Encoder 49 outputs a pulse signal at every movement of a predetermined distance by cups 24. The output of encoder 49 is used to detect the number of remaining films according to the moving distance of cups 24. Detector 60 is made of a photosensor for detecting that cups 24 are disposed at a predetermined reference position for which the displacement of cups from the bottom in magazine 21 is known, such as a position corresponding to the upper surface of the 50-th film from the bottom. Detector 60 is mounted at the side of holder 45.

Second drive unit 25C as shown in FIG. 3 has guide rails 50A, 50B, idle sprockets 51, drive sprocket 52, looped chain 53, rightward and leftward drive motor 54 and a coupling member (not shown). Two rails 50A and 50B are fixedly secured to side plate 20A in a lateral direction in parallel with one another as shown in FIG. 4. Holder 45 is leftwardly and rightwardly movably mounted on rails 50A, 50B. Sprockets 51 and 52 are provided between rails 50A and 50B and chain 53 is engaged under a suitable tension with sprockets 51 and 52. Sprocket 52 is rotatably driven by motor 54. Chain 53 is driven by the rotation of sprocket 52. Chain 53 is coupled through the coupling member (not shown with holder 45. In other words, holder 45 is driven along rails 50A, 50B through chain 43 by motor 54, and linearly moved in a direction of an arrow B of FIG. 3.

Drive mechanism 25 can arbitrarily move cups 24 laterally and longitudinally as shown in FIG. 3, under the drive control of motors 47 and 54 and can arbitrarily rotate cylinder 41 and cups 24 by motor 43 along the central axis of cylinder 41.

Figure 7:
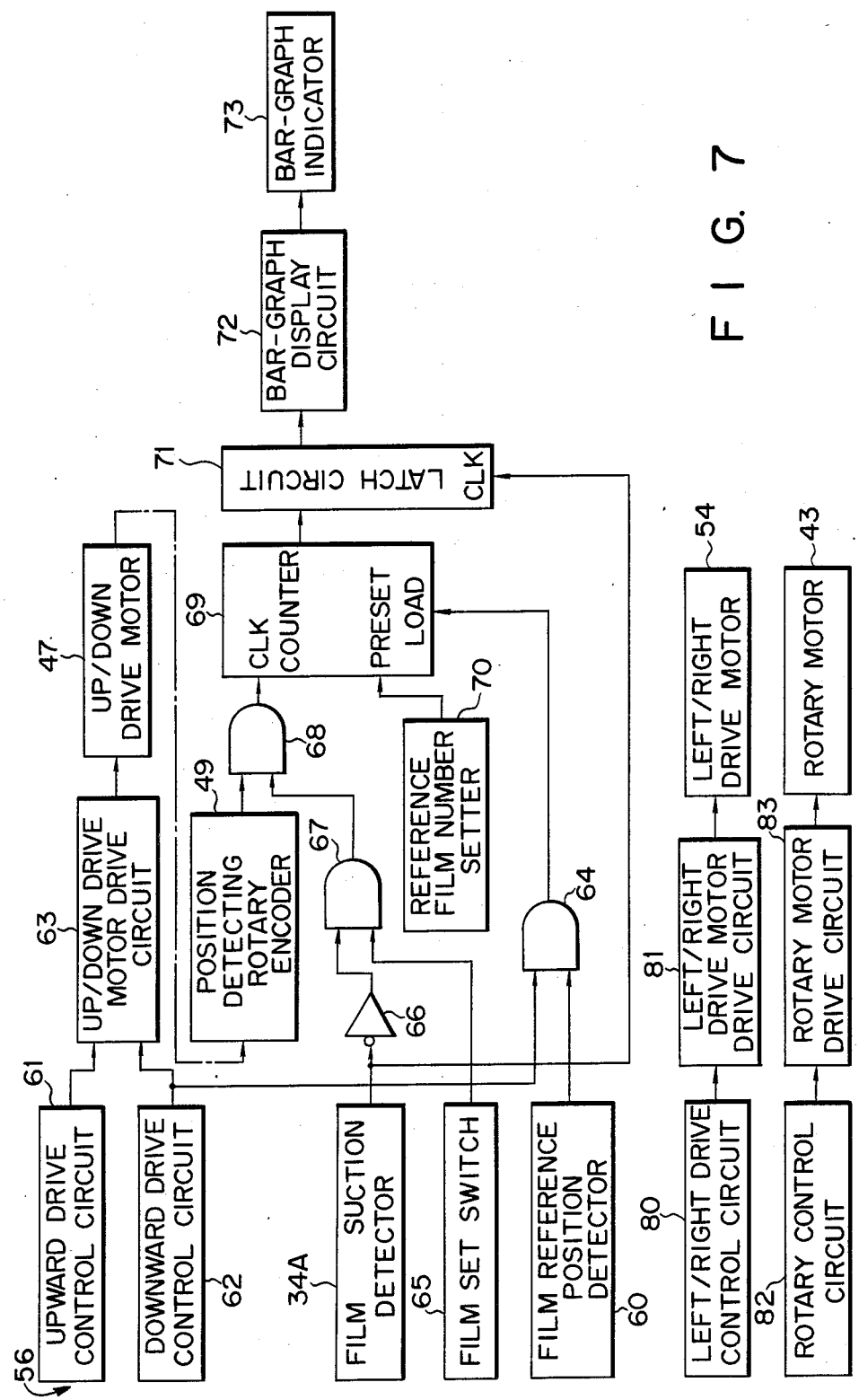
FIG. 7 is a perspective view showing a control circuit of the apparatus of FIG. 2.

The arrangement of essential portions of drive control circuit 56 for moving cups 24 along a predetermined route by controlling the driving amount of motor 43 for rotating drive mechanism 25, motor 47 for driving upwardly and downwardly, and motor 54 for driving leftwardly and rightwardly is shown in FIG. 7. A remainder detector for detecting the number of remaining films by the positions of cups when suction detector 34A operates when cups 24 move downwardly (in a direction of arrow A1 of FIG. 2) and is provided in control circuit 56.

Motor drive circuit 63, for driving the motor upwardly and downwardly, drives and controls motor 47 in response to control signals inputted from upward and downward drive control circuits 61 and 62. Encoder 49 cooperates with the output shaft of motor 47. Reference position detector 60 detects when cups 24 are at the position contacting the 50-th film from the bottom in magazine 21. First AND gate 64 produces a logical product of a detection signal from detector 60 (which is "H (high level)" when the film is disposed at the reference position) and a control signal from control circuit 62 (which is "H" at downward drive time). Film set switch 65 is operated by an operator when a film for X-ray imaging is set in holder 26 to produce a "H" signal. Detector 34A outputs "H" when the film is attracted by cups 24. Inverter 66 inverts a detection signal from detector 34A and outputs the signal. Second AND gate 67 produces a logical product of output signals of switch 65 and inverter 66. Third AND gate 68 produces a logic product of the output signal of gate 67 and a pulse signal which is generated at every predetermined moving distance from encoder 49. The output of gate 68 is applied to clock signal terminal (CLK) of programmable counter 69. The output of reference film number setter 70 is applied to preset signal terminal (PRESET) of counter 69. The output of gate 64 is connected with load terminal (LOAD) for loading the preset value of counter 69. Latch circuit 71 includes, for example, a D type flip-flop and latches the output of counter 69. The output of detector 34A is applied to clock signal terminal (CLK) of latch circuit 71. The output of latch circuit 71 is applied to a bar-graph display circuit 72, and the output of display circuit 72 is applied to bar-graph indicator 73.

Leftward and rightward drive control circuit 80 drives and controls motor 54 through leftward and rightward drive motor drive circuit 81, and rotary control circuit 82 drives and controls motor 43 through rotary motor drive circuit 83.

The operation of the above-mentioned X-ray radiography apparatus will be described in detail.

When switch 65 is operated by an operator and unexposed film removal from magazine 21 is started, unexposed film contained in the uppermost portion of magazine 21 is attracted by cups 24 by the operations of mechanism 25 and control circuit 56. Cups 24 which have attracted unexposed films are moved upwardly and rockably reciprocated at a predetermined angle f1 at point a2 (for fluctuating and dropping the second and following films) in FIG. 2, and then moved to point a1. Cups 24 which have attracted the unexposed films are then moved rightwardly to point c, rotated at angle f3 at point c, and then moved obliquely upwardly to point d. Cups 24 which have further attracted the unimaged film are rotated at angle f4 at point d, then moved to point e. The unexposed film thus conveyed is fed by rollers 27A and 27B into holder 26 for X-ray imaging.

The operation of the remainder detector at this time will be described by referring to FIGS. 8A to 8J. Setter 70 sets 50 sheets of films in this case, and counter 69 subtracts the counted value by a clock signal, i.e., down-counts the value. Encoder 49 couples cups 24 with motor 47 at a reduction gear ratio set to output one pulse whenever cups 24 move at a distance of 0.2 mm corresponding to the thickness of one film sheet.

When switch 65 is operated, the output of switch 65 (FIG. 8B) becomes "H". Simultaneously, a drive control signal is outputted from control circuit 62 (FIG. 8C), motor 47 is driven by a drive signal from drive circuit 63, and cups 24 are moved downwardly, as shown in FIG. 2 (as designated by an arrow A1). At this time, pump 34 also starts operating. When cups 24 are moved downwardly, and have arrived at the position corresponding to the 50-th film from the bottom in magazine 21, the output signal from detector 60 becomes "H". Since the control signal from 62 is "H" at this time, the output signal (FIG. 8H) of gate 64 becomes "H" (at time t1). A predetermined value (here 50) from setter 70 is preset in counter 69 by the rise of the output signal of gate 64. Then, since the output of inverter 66 (FIG. 8E) is "H" until cups 24 attract the films and the output signal from detector 34A becomes "H" (i.e., during the time from time t1 to time t2) and the output signal of switch 65 is "H", the output signal of gate 67 (FIG. 8F) is "H". The output of gate 68 becomes, as shown in FIG. 8G, the same pulse signal as the output of encoder 49 shown in FIG. 8A. Therefore, if the number of remaining films is, for example, 45 sheets less by five sheets than 50 sheets, counter 69 decriments the counted value at every rise of the output pulse of gate 68, and the counted value becomes 45 at time t2. When cups 24 attract the films at time t2 and the output signal of detector 41A (FIG. 8D) becomes "H", latch circuit 71 inputs the output of counter 69 by the rise of the output signal, and holds it after time t2. The output of latch circuit 71 (FIG. 8J) is applied through display circuit 72 to indicator 73, which indicates the counted value latched by latch circuit 17 on a bar graph. If indicator 73 has, for example, the capability of displaying 50 segments, one segment can be deenergized in the display whenever one unimaged film is conveyed. Since indicator 73 ordinarily employs several segments, one segment is deenergized whenever a predetermined number of unimaged films are conveyed.

A warning circuit is provided to provide an alarm when the count value of counter 69 or the output of latch circuit 71 becomes 10 or less, in order to warn the operator of the fact that only a few sheets are remaining in magazine 21.

The present invention is not limited to the particular embodiments described above. Various other changes and modifications may be made within the spirit and scope of the present invention.

In the above-mentioned embodiment, the output pulses of encoder 49 are counted by a discrete logic circuit. However, when a microcomputer system is used in the X-ray radiography apparatus, these output pulses are counted by means of software and the remainder is also determined by software. The correct number of remaining films can, therefore, be displayed.

If supply magazine 21 can contain more than 50 films, for example 100 films, reference position detectors are preferably provided at the positions corresponding to 100 or more, and the detectors may be, for example, provided at suitable positions out of the magazine (where the displacement from the bottom in the magazine is known) such as the positions corresponding to the points a1 of FIG. 2.

The present invention can be applied not only for use with X-ray radiography apparatus employing X-ray films but also can be used with other imaging medium sheet, such as a system which employs a cumulative or stimulable phosphor (for imaging plate). In this case, since the imaging plate has approx. 0.8 mm of thickness, rotary encoder 49 may preferably employ a rotary encoder which outputs one pulse whenever cups 24 move at 0.8 mm.

In the embodiments described above, one pulse has been outputted from the encoder whenever one imaging medium sheet is moved. However, the present invention is not limited to the particular embodiments. For example, a plurality of output pulses of the encoder may correspond to one imaging medium sheet, this may be converted to the number of films of the imaging medium sheets to display on the indicator. The conversion from the output of the encoder to the number of imaging medium sheets can be readily performed by a counter.

In the above embodiment, the number of remaining, unexposed medium sheets is displayed by a scale having a pointer.

What is claimed is:

1. An X-ray radiography apparatus comprising:
   sheet magazine means for containing stacked unimaged imaging medium sheets;
   removing means, having attraction means for attracting the imaging medium sheets, for removing the medium sheets one by one from said sheet magazine means by moving the attraction means and controlling the attraction of the attraction means;
   X-ray imaging means for forming an X-ray image of an object on the medium sheet removed by the removing means;
   reference position detecting means for detecting when the attraction means passes a predetermined reference position, a reference displacement of the attraction means in a direction of the thickness of the stacked imaging medium sheets with reference to the inner bottom of said sheet magazine means being known when the attraction means is at the reference position;
   attraction detecting means for detecting when said attraction means attracts one of the medium sheets and for generating a detection signal;
   moving distance detecting means for detecting a moving distance of said attraction means, said moving distance detecting means having a pulse encoder for generating a pulse each time said attraction means moves a predetermined distance in the direction of the thickness of the stacked imaging medium sheets;
   discriminating means for determining the number of remaining medium sheets in the magazine means on the basis of an attraction displacement of said attraction means in the direction of the thickness of the stack imaging medium sheets with reference to the bottom of said sheet magazine means, the attraction displacement being derived from the moving distance of said attraction means between the reference position and a position where the attraction means is located when the detection signal is generated by said attraction detecting means; and
   display means for indicating the number of remaining medium sheets obtained by the discriminating means.

2. An X-ray radiography apparatus according to claim 1, wherein the attraction means is a suction unit for attracting an imaging medium sheet by a vacuum suction.

3. An X-ray radiography apparatus according to claim 1, wherein said reference position detecting means includes means for detecting the reference position when said attraction means is disposed within the sheet magazine means.

4. An X-ray radiography apparatus according to claim 1, wherein said attraction means comprises a vacuum pump and at least one suction cup connected to the vacuum pump, and said attraction detecting means is a vacuum switch provided in said vacuum pump.

5. An X-ray radiography apparatus according to claim 1, wherein said discriminating means includes a counter for counting the output pulse of said pulse encoder.

6. An X-ray radiography apparatus according to claim 1, wherein said discriminating means includes counter means for down-counting the pulses output by said pulse encoder until the detection signal is generated by said attraction detecting means, said counter means being preset to a predetermined value in response to the output of said reference position detecting means.

7. An X-ray radiography apparatus according to claim 1, wherein said display means includes means for displaying the number of remaining imaging medium sheets in said sheet magazine means in a bar graph format.

8. An X-ray radiography apparatus comprising:
sheet magazine means for containing stacked unimaged imaging medium sheets;
removing means, having an attraction means for attracting the imaging medium sheets, for removing the medium sheets one by one from said sheet magazine means by moving the attraction means and controlling the attraction of the attraction means;
X-ray imaging means for forming an X-ray image of an object on the medium sheet removed by said removing means;
reference position detecting means for detecting when the attraction means passes a predetermined reference position, a reference displacement of the attraction means in a thickness direction of the imaging medium sheets with reference to the inner bottom of the magazine means being known when the attraction means is at the reference position;
attraction detecting means for detecting when said attraction means attracts the imaging medium sheets and for generating a detection signal;
moving distance detecting means for detecting a moving distance of said attraction means at least in the thickness direction;
discriminating means for determining the number of remaining imaging medium sheets in the magazine means, on the basis of an attraction displacement of the attraction means in the thickness direction with reference to the bottom of said sheet magazine means, the attraction displacement being derived from the moving distance of the attraction means between the reference position and a position where the attraction means is located when the detection signal is generated from said attraction detecting means; and
display means for indicating the number of remaining imaging medium sheets as obtained by said discriminating means.

* * * * *